(12) United States Patent
Acks et al.

(10) Patent No.: US 9,205,917 B2
(45) Date of Patent: Dec. 8, 2015

(54) VERTICALLY RETRACTING SIDE ARTICULATING LANDING GEAR FOR AIRCRAFT

(75) Inventors: James P. Acks, Medina, OH (US); Dennis W. Martin, Woodinville, WA (US)

(73) Assignee: Goodrich Corporation, Charlotte, NC (US)

( * ) Notice: Subject to any disclaimer, the term of this patent is extended or adjusted under 35 U.S.C. 154(b) by 1035 days.

(21) Appl. No.: 13/287,177

(22) Filed: Nov. 2, 2011

(65) Prior Publication Data

US 2012/0111999 A1    May 10, 2012

Related U.S. Application Data

(60) Provisional application No. 61/410,654, filed on Nov. 5, 2010.

(51) Int. Cl.
  *B64C 25/12* (2006.01)
  *B64C 25/58* (2006.01)
  *B64C 25/10* (2006.01)

(52) U.S. Cl.
  CPC ........... *B64C 25/12* (2013.01); *B64C 2025/125* (2013.01)

(58) Field of Classification Search
  CPC .............. B64C 25/12; B64C 2025/125; B64C 2025/325
  USPC ............... 244/102 R, 102 A, 102 SL, 102 SS
  See application file for complete search history.

(56) References Cited

U.S. PATENT DOCUMENTS

| | | | |
|---|---|---|---|
| 2,021,439 A | 11/1935 | Wells | |
| 2,589,434 A * | 3/1952 | Robert | ...................... 244/102 R |
| 2,691,496 A | 10/1954 | Katzenberger | |
| 2,973,168 A | 2/1961 | Hartel | |
| 2,984,437 A | 5/1961 | Jensen et al. | |
| 3,121,547 A | 2/1964 | Paxhia et al. | |
| 3,822,048 A | 7/1974 | Hartel | |
| 3,951,361 A | 4/1976 | Hrusch | |
| 4,537,374 A * | 8/1985 | Barnoin et al. | ........... 244/102 R |

FOREIGN PATENT DOCUMENTS

| | | |
|---|---|---|
| GB | 456632 | 11/1936 |
| GB | 860432 | 2/1961 |

OTHER PUBLICATIONS

Office Action issued Jun. 26, 2015 in Application JP2011-241812.

* cited by examiner

*Primary Examiner* — Joseph W Sanderson
*Assistant Examiner* — Marc Burgess
(74) *Attorney, Agent, or Firm* — Snell & Wilmer, L.L.P.

(57) ABSTRACT

A side articulating main landing gear assembly for an aircraft which includes a wheel axle fitting oriented in a horizontal plane when the landing gear assembly is in an extended condition deployed from a landing gear bay of the aircraft, a shock absorber adapted to stroke between an extended state and a compressed state upon landing the aircraft, a first linkage for maintaining a tire supported on the wheel axle fitting in a substantially vertical plane as the shock absorber strokes between the extended state and the compressed state, and a second linkage for maintaining the wheel axle fitting in the horizontal plane as the shock absorber strokes between the extended state and the compressed state. The first and second linkages are adapted and configured to minimize lateral tire scuffing during shock absorber stroking.

14 Claims, 4 Drawing Sheets

VERTICALLY RETRACTING SIDE ARTICULATING LANDING GEAR FOR AIRCRAFT

CROSS-REFERENCE TO RELATED APPLICATIONS

The subject application claims the benefit of priority to U.S. Provisional Patent Application Ser. No. 61/410,654, filed Nov. 5, 2010, the disclosure of which is incorporated herein in its entirety.

BACKGROUND OF THE INVENTION

1. Field of the Invention

The subject invention is directed generally to aircraft landing gear, and more particularly, to side articulating main landing gear for a helicopter, which is adapted to minimize lateral tire scuffing during shock strut stroking and configured to stow vertically into the landing gear bay of the aircraft upon retraction.

2. Background of the Related Art

Helicopter main landing gears are frequently designed to remain in a fixed or landing position throughout flight, as disclosed in U.S. Pat. No. 2,691,496 to Katzenberger and U.S. Pat. No. 3,822,048 to Hartel. Side articulating main landing gear have also been developed for helicopters, as disclosed in U.S. Pat. No. 3,951,361 to Hrusch. Those skilled in the art have also appreciated the need to eliminate or at least minimize lateral side scuffing of the tires on main landing gears of helicopters, as disclosed in U.S. Pat. No. 2,984,437 to Jensen et al. and U.S. Pat. No. 3,121,547 to Paxhia et al.

Oftentimes, the size and capacity of the landing gear bay of a helicopter is constrained by features such as the airframe structure, the location of the cockpit, the size of the crew cabin and the location of the hydraulics/electronics bay. Consequently, the volume of available space often dictates the type of kinematic mechanism that is used to articulate the landing gear from a retracted or stowed position to an extended or deployed position.

It would be beneficial to provide landing gear assembly for a helicopter that has a relatively narrow and nearly vertical landing gear bay, and which is also adapted to minimize or otherwise eliminate lateral tire scrubbing during gear stroking, while absorbing relatively high energy levels and a large vertical tire displacement upon landing.

SUMMARY OF THE INVENTION

The subject invention is directed to a unique side articulating main landing gear assembly that is particularly well suited for use in a helicopter or other aircraft having a landing gear bay that is relatively narrow and nearly vertical in configuration. In addition, the landing gear assembly of the subject invention is adapted to minimize or otherwise eliminate lateral tire scrubbing during gear stroking, and it is configured to absorb relatively high energy levels and a large vertical tire displacement upon landing.

As described in more detail below, the landing gear assembly of the subject invention includes a wheel axle fitting that is oriented in a horizontal plane when the landing gear is in an extended condition deployed from the landing gear bay of the aircraft. A tire is supported on the wheel axle fitting and is oriented in a vertical plane when the landing gear is in the extended condition. The landing gear further includes a levered shock absorber that is adapted to stroke between an extended state and a compressed state to effectively absorb the kinetic energy of a landing.

The landing gear assembly further includes a set of articulating links that are operatively connected to the wheel axle fitting, the shock absorber and the aircraft. The articulating links are configured to maintain the tire in its substantially vertical plane as the shock absorber strokes between the extended state and the compressed state. The landing gear assembly also includes a set of tire planing links that are operatively connected to the wheel axle fitting and the articulating links. The tire planing links are configured to maintain the wheel axle fitting in its horizontal plane as the shock absorber strokes between the extended state and the compressed state.

A drive crank is operatively connected to the shock absorber, the tire planing links, the articulating links and the aircraft. The drive crank is configured to move the landing gear assembly between the extended condition and an inverted retracted condition stowed in the landing gear bay of the aircraft. The drive crank can optionally define a skewed trunnion axis configured to permit landing gear retraction with at least some degree of forward or aft motion if needed for a given application's geometry. A reforming brace is operatively connected to the aircraft, the drive crank, the articulating links and the shock absorber for locking the landing gear assembly in the extended condition and the inverted retracted condition.

Those skilled in the art will appreciate that by using a levered type shock absorber, the vertical displacement of the tire during landing is not directly proportional to the shock absorber stroke displacement. This allows the landing gear assembly to absorb a relatively high amount of kinetic energy with a relatively short shock strut stroke during landing. Shorter shock strut travel is critical for the efficient stowage of the landing gear in a size restricted bay.

These and other aspects of the side articulating main landing gear assembly of the subject invention will become more readily apparent from the following detailed description of the preferred embodiments taken in conjunction with the drawings.

BRIEF DESCRIPTION OF THE DRAWINGS

So that those having ordinary skill in the art to which the subject invention pertains will more readily understand how to make and use the vertically retracting side articulated landing gear assembly of the subject invention, preferred embodiments thereof will be described in detail hereinbelow with reference to the drawings, wherein.

DETAILED DESCRIPTION OF THE PREFERRED EMBODIMENTS

Figure 1:
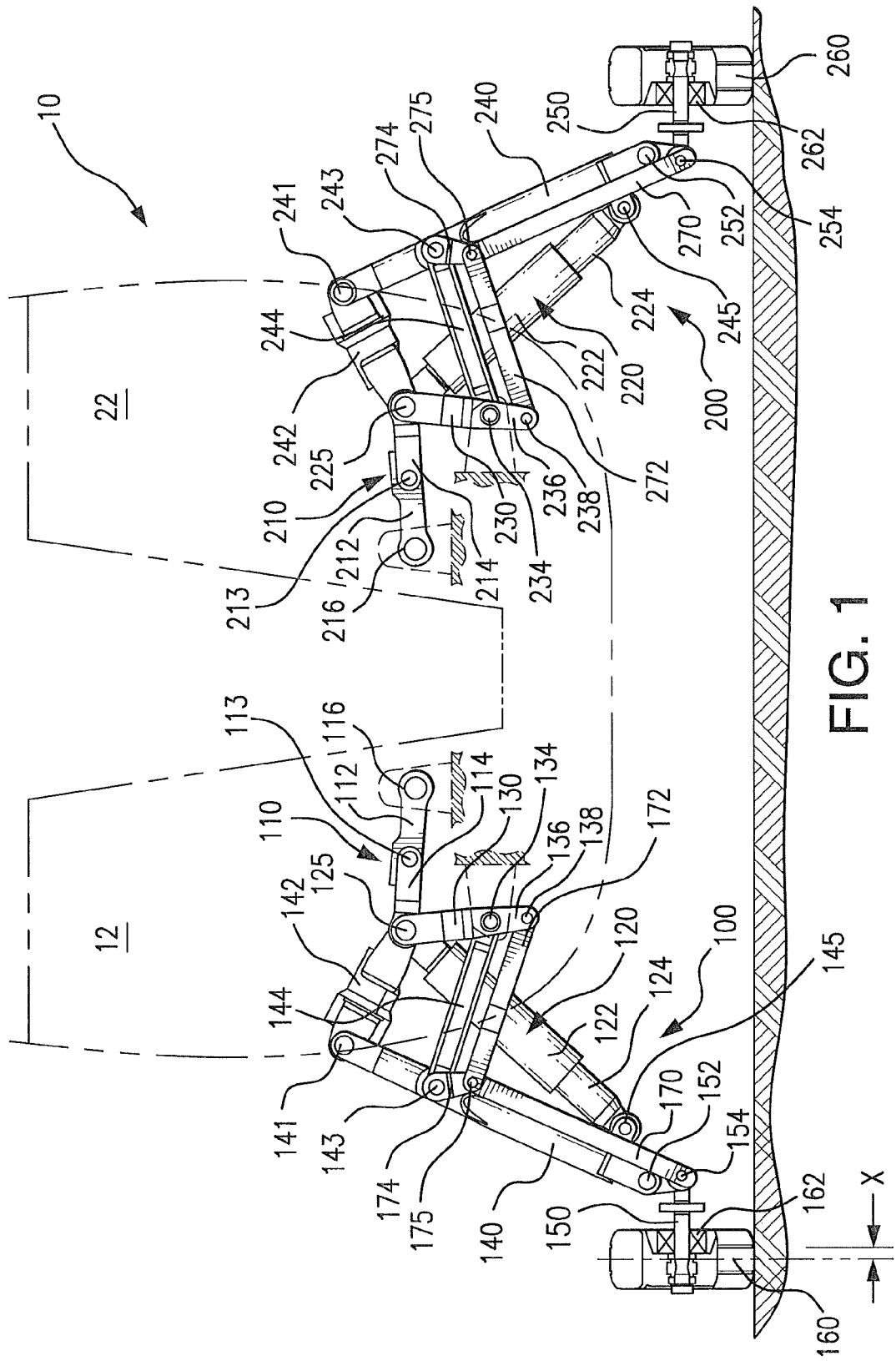
FIG. 1 is a cross-sectional view of an aircraft employing the side articulating landing gear assembly of the subject invention, with the landing gear shown in an extended condition deployed from the landing gear bay of the aircraft, and wherein the shock strut of each landing gear assembly is partially compressed under the static weight of the aircraft.

Referring now to the drawings wherein like reference numerals identify similar structural elements or features of the subject invention, there is illustrated in FIG. 1 an aircraft 10 that includes side articulating main landing gear constructed in accordance with a preferred embodiment of the subject invention and designated generally by reference numerals 100 (left) and 200 (right). The main landing gear 100, 200 is adapted and configured for articulated movement between an extended position deployed from the left and right landing gear bays 12, 22 of aircraft 10, and an inverted retracted position stowed vertically within the landing gear bays 12, 22 of aircraft 10.

It is envisioned that the subject invention can be configured for use with landing gear bays that allow for a skewed trunnion axis (pivot axis) which would permit the landing gear assembly to retract forward or aft to at least some degree depending upon the need or application. There is not necessarily a functional relationship between the kinematics of operation when deployed and the kinematic operation during retraction. These are two independent modes of operation for the landing gear. While the left and right gear 100, 200 is illustrated and described herein as being independent of one another, in terms of assembly and operation, it is envisioned that they could be coupled together to form a unitary truss which would reduce airframe loading and weight.

Referring now to FIG. 1, the aircraft 10 is illustrated in a steady-state condition, at rest on the ground. In this position, the weight of the aircraft 10 is supported by the right and left landing gear 100, 200. Left landing gear assembly 100 includes a reforming brace 110. Reforming brace 110 includes an inboard brace link 112 and an outboard brace link 114. The brace links 112, 114 are connected to one another at an over-centered pivot point 113. The brace links 112, 114 reside in a locked condition when landing gear assembly 100 is down, extended from the landing gear bay 12 (see FIG. 1), and when the gear assembly 100 is up; retracted within the landing gear bay 12 (see FIG. 4). The inboard brace link 112 is connected to the aircraft fuselage at pin 116. Similarly, the right landing gear assembly 200 includes a reforming brace 210, with inboard and outboard brace links 212, 214 connected at over-centered pivot point 213, and the inboard brace link 212 connected to the fuselage at pin 216.

With continuing reference to FIG. 1, the left landing gear assembly 100 further includes a levered shock (strut) absorber 120, which has an upper cylinder 122 and a lower reciprocating piston 124. The upper cylinder 122 is pivotally connected to a main drive crank 130 at pivot point 125. The main drive crank 130 is adapted and configured to effectuate articulated movement of the gear assembly 100, as described in further detail below. The drive crank 130 is also attached to the aircraft fuselage at pin 134. Similarly, the right landing gear assembly 200 includes a levered shock (strut) absorber 220 having an upper cylinder 222 and a lower piston 224, with the upper cylinder 222 connected to a drive crank 230 at pin 225, and wherein the drive crank 230 is connected to the fuselage at pivot point 234.

The left landing gear assembly 100 also includes a set of three articulating links that are operatively connected to the shock absorber 120 and to the drive crank 130. The articulating links include a main articulating link 140, an upper transverse link 142 and a lower transverse link 144. The distal end of the main articulating link 140 is pivotally connected to a horizontal wheel axle fitting 150 at an upper pin 152. Wheel axle fitting 150 is adapted and configured to support a tire 160 in a vertical plane. The wheel axle 150 fitting can also support a brake assembly 162.

The proximal end of main articulating link 140 is pivotally connected to the outboard end of the upper transverse link 142 at pin 141. In addition, the lower transverse link 144 is pivotally connected to the main link 140 along its span at pin 143, below the pivot point for the upper transverse link 142. The inboard end of the upper transverse link 142 is pivotally connected to the upper end of crank link 130 and the upper end of the cylinder 122 of shock absorber 120. The folding reforming brace assembly 110 is connected to the same pin 125 as the shock absorber 120. While the reforming brace 110 is positioned outside the plane of the shock absorber 120 to allow for gear retraction, those skilled in the art will readily appreciate that a reforming brace could be in the plane of the shock absorber without departing from the spirit and scope of the invention.

Figure 2:
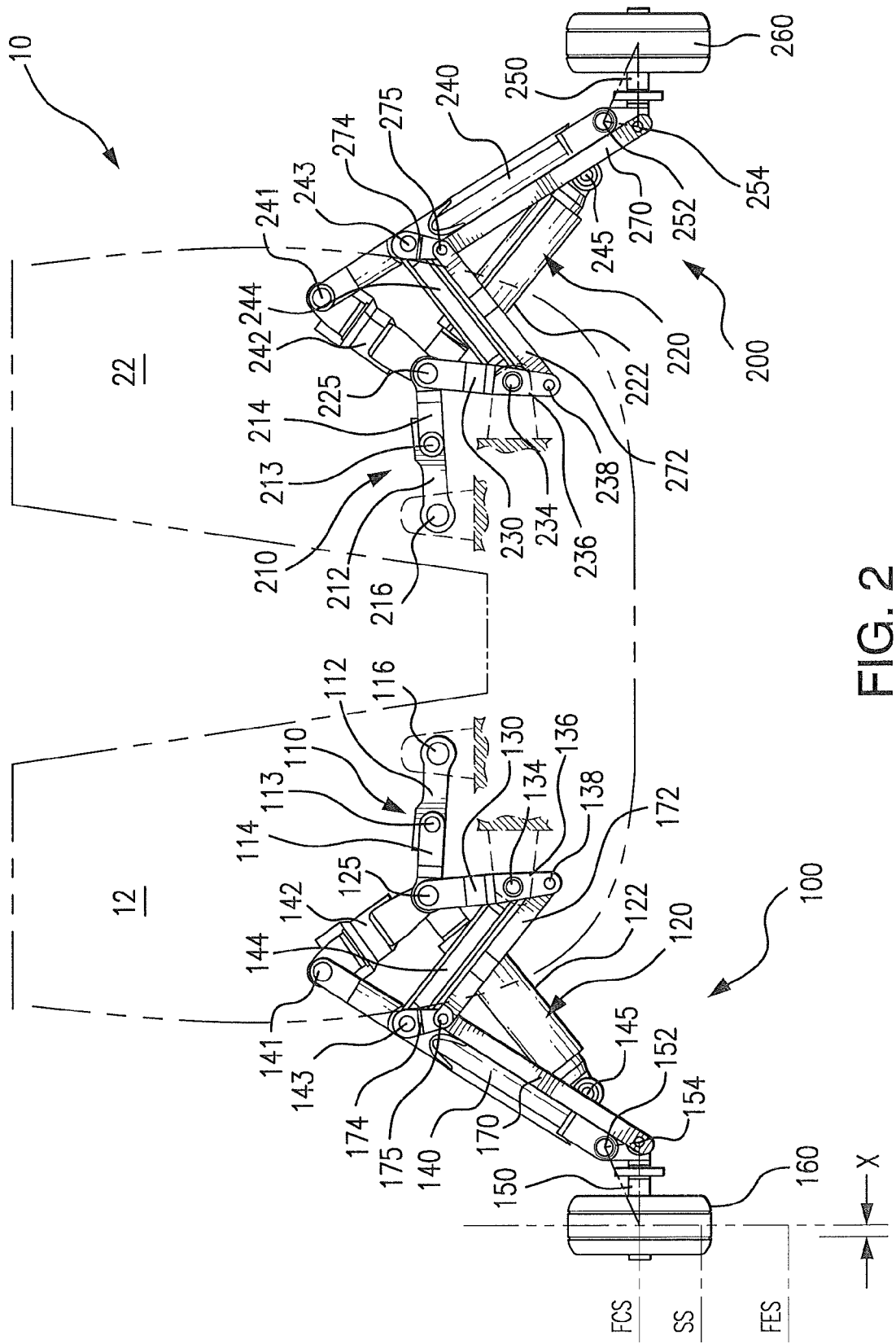
FIG. 2 is a cross-sectional view of the aircraft illustrated in FIG. 1, showing the fully stroked condition of the landing gear assembly upon landing the aircraft and fully compressing the shock struts as they absorb the kinetic energy of the landing.

In addition, the lower end of the reciprocating piston 124 of shock absorber 120 is pivotally connected to the main link 140 along its span at pin 145 below the attachment point 143 for the lower link 144 (as oriented in FIG. 1). The articulating links 170, 172, 174, allow the tire 160 to move in a vertical plane when the shock absorber 120 strokes between an extended state and a compressed state upon landing the aircraft 10, as shown in FIG. 2.

Similar to the left landing gear assembly 100, the right landing gear assembly 200 includes a main articulating link 240, an upper transverse link 242 and a lower transverse link 244. The distal end of the main articulating link 240 is pivotally connected to a horizontal wheel axle fitting 250 which supports a tire 260 in a vertical plane, along with a brake assembly 262. Links 240 and 244 are connected at pin 241, while links 244 and 240 are connected at pin 243.

With continuing reference to FIG. 1, landing gear assembly 100 further includes a set of three tire planing links that are located inboard of the articulating links for keeping the axle fitting 150 horizontal to the ground when the shock absorber 120 strokes between an extended state and a compressed state, upon landing the aircraft 10. The three tire planing links include a lower planing link 170, an upper planing link 172 and a free floating medial planing link 174.

The lower planing link 170 extends parallel to the main articulating link 140 and is pivotally attached to the axle fitting 150 at a lower attachment point 154 below the attachment to upper pin 152 for the main articulating link 140 (as oriented in FIG. 1). The upper end of planing link 170 is pivotally attached to the lower end of the medial planing link 174 at pin 175. The upper end of medial planing link 174 is pivotally attached to the articulating link 140 at pivot pin 143, which is shared by the lower transverse link 144. Axle fitting 150 would be free to rotate except for the attachment of lower planing link 170 at lower attachment point 154. As the gear strokes, this lower planing link 170, which is driven by upper planing link 172 and medial planing link 174 in radial movement, controls the tire 160 in relationship to the ground.

The outboard end of the upper planing link 172 is also pivotally attached to the lower end of the medial planing link 174 at pin 175 and the inboard end of the upper planing link 172 is pivotally attached to the lower crank arm 136 of drive crank 130 at pin 138. Lower crank arm 136 is integral with drive crank 130. Planing link 172 runs parallel to the lower articulating link 144. While planing links 170 and 172 are positioned parallel to the respective articulating links 140 and 144, they may be adjusted slightly to help reduce the side scrubbing of the tire. Therefore, if the tire tends to scrub outboard at a particular stroke, planing links 170 and 172 can be used to angle the axle and effectively keep the bottom of tire 160 in the same plane.

Similar to the left landing gear assembly 100, the right landing gear assembly 200 includes a lower planing link 270, an upper planing link 272 and a free floating medial planing link 274. The lower planing link 270 extends parallel to the main articulating link 240 and is pivotally attached to the axle fitting 250 at a lower attachment point 254 below the attachment to upper pin 252 for the main articulating link 240 (as oriented in FIG. 1). The upper end of planing link 270 is pivotally attached to the lower end of the medial planing link 274 at pin 275. The upper end of medial planing link 274 is pivotally attached to the articulating link 240 at pivot pin 243, which is shared by the lower transverse link 244. The outboard end of the upper planing link 272 is also pivotally attached to the lower end of the medial planing link 274 at pin 275 and the inboard end of the upper planing link 272 is pivotally attached to the lower crank arm 236 of drive crank 230 at pin 238. The control of the tire 260 in relationship to the ground is similar to that described above with respect to tire 160.

Referring now to FIG. 2, upon landing the aircraft 10, the shock struts 120, 220 stroke to a compressed state as it absorbs the kinetic energy of the landing. As the shock struts 120, 220 stroke, the articulating linkage of the landing gear assemblies 100, 200 maintain the tires 160, 260 in a semi-vertical or vertical plane. The goal is to create a full tire foot print relative to the ground.

After the initial impact of landing has passed, the shock struts 120, 200 extend to the static stroke position shown in FIG. 1, in which the static weight of the aircraft 10 rests on landing gear assemblies 100, 200. When comparing FIGS. 1 and 2, it can be seen that there may be a relatively small amount of lateral (horizontal) movement "x" of the tire center line that occurs as the landing gear transitions from the fully stroked compressed condition of FIG. 2 to the static position of FIG. 1. Those skilled in the art will readily appreciate that it is advantageous to reduce this lateral movement as much as possible to reduce or otherwise eliminate side scrubbing of the tires.

Figure 3:
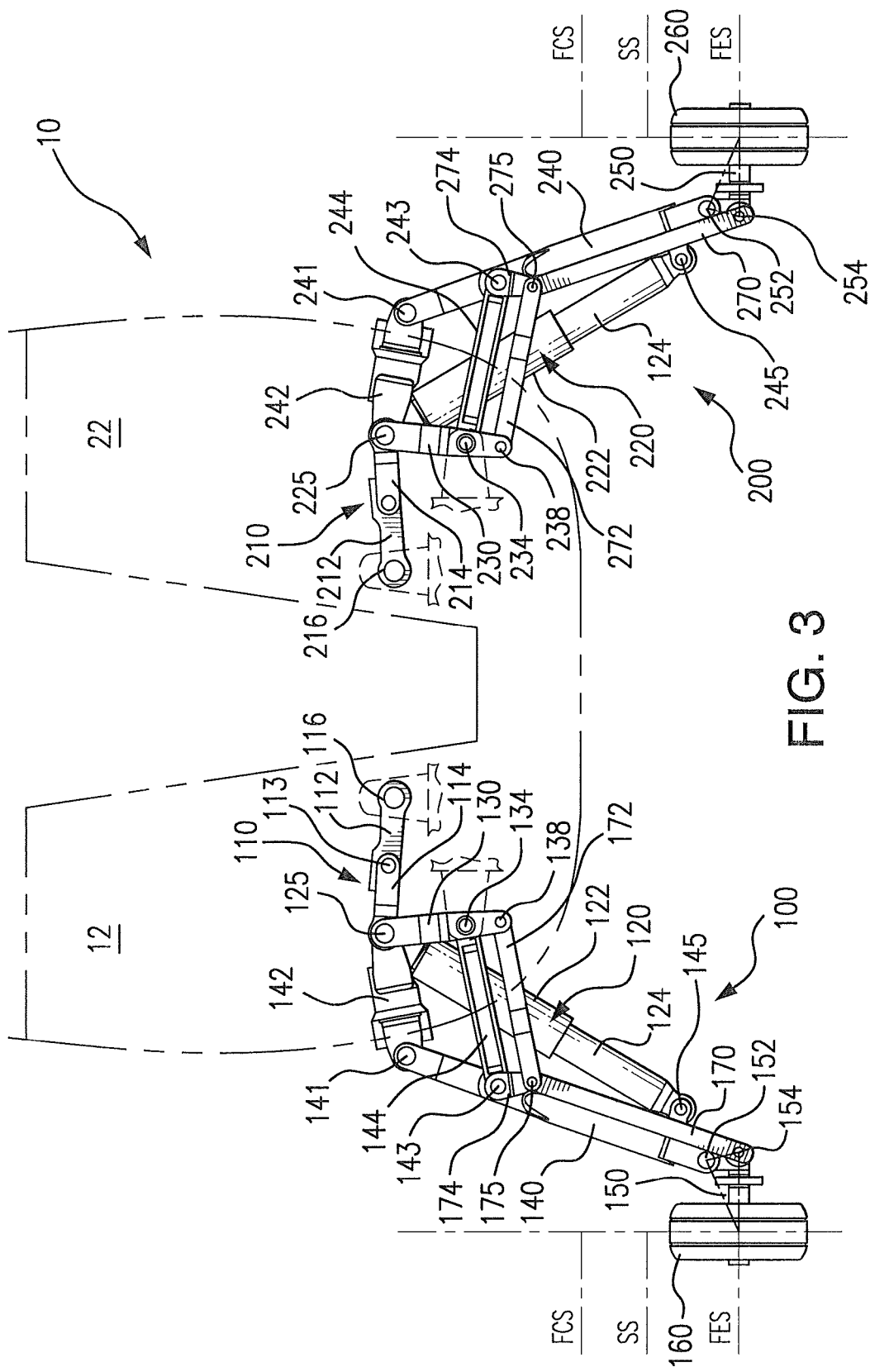
FIG. 3 is a cross-sectional view of the aircraft illustrated in FIG. 1, showing the condition of the landing gear assembly when the aircraft is aloft and the shock struts are both fully extended.

Upon take-off, the landing gear assembly 100, 200 assumes the fully extended condition shown in FIG. 3. Without the weight of the aircraft 10, the shock struts 120, 220 are fully extended. When the aircraft 10 is aloft, the landing gear 100, 200 may be retracted upon demand. To effectuate a gear retraction cycle, the drive cranks 130, 230 are actuated, so as to rotate about pivot pins 134, 234 through, for example, a 120° arc.

Figure 4:
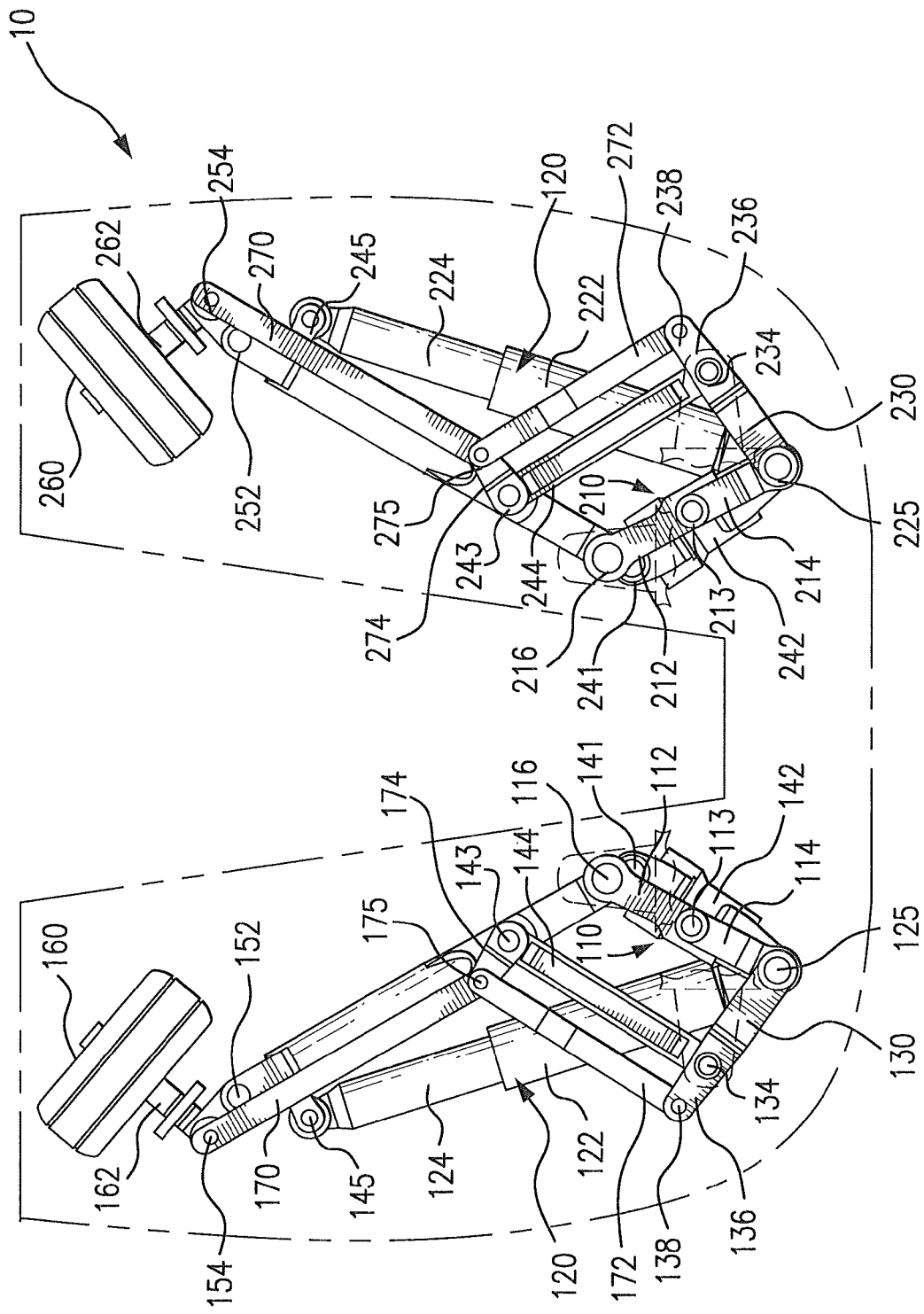
FIG. 4 is a cross-sectional view of the aircraft illustrated in FIG. 1, showing the landing gear assembly in an inverted retracted condition, stowed vertically within the landing gear bay of the aircraft.

Those skilled in the art will readily appreciate that the 120° arc is exemplary only, and that any suitable angle can be used from application to application without departing from the spirit and scope of the invention. This rotational motion causes the landing gear assembly 100, 200 to invert into a tire high position for stowage in the landing gear bays 12, 22 of aircraft 10, as shown in FIG. 4. It is envisioned that drive cranks 130, 230 can be rotated though mechanical, hydraulic or motorized means. It should be appreciated that the reforming braces 110, 210 are out of plane from the shock absorber 120, 220 due to volume restrictions only.

By using a levered type shock absorber arrangement, the vertical displacement of the tires 160, 260 during landing is not directly proportional to the shock absorber stroke. This allows the landing gear assembly 100, 200 to absorb a high amount energy with relatively short strut travel. Those skilled in the art will readily appreciate that shorter strut travel is critical for efficient stowage in a restricted gear bay. Furthermore, because the line of action of each shock strut 120, 220 is aligned in the direction of the linkage system, and due to the moment arms resulting from this configuration, load transfer into the airframe 10 is enhanced.

While the subject invention has been described with respect to preferred and exemplary embodiments, those skilled in the art will readily appreciate that various changes and/or modifications can be made to the invention without departing from the spirit or scope of the invention as described herein.

What is claimed is:

1. A side articulating main landing gear assembly for an aircraft, comprising:
   a) a wheel axle fitting oriented in a horizontal plane when the landing gear assembly is in an extended condition deployed from a landing gear bay of the aircraft;
   b) a shock absorber adapted to stroke between an extended state and a compressed state upon landing the aircraft;
   c) a first linkage for maintaining a tire supported on the wheel axle fitting in a substantially vertical plane as the shock absorber strokes between the extended state and the compressed state; and
   d) a second linkage for maintaining the wheel axle fitting in said horizontal plane as the shock absorber strokes between the extended state and the compressed state, wherein the first and second linkages are adapted and configured to minimize lateral tire scuffing during shock absorber stroking.
   e) a drive crank operatively connected to the shock absorber, the first linkage and the second linkage for moving the landing gear assembly between the extended condition deployed from the landing gear bay and an inverted retracted condition stowed in the landing gear bay; and
   f) a reforming brace operatively connected to the aircraft, the drive crank, the first linkage and the shock absorber for locking the landing gear in the extended condition and in the retracted condition; wherein the reforming brace includes inboard and outboard brace links connected to one another at an overcentered pivot point.

2. A side articulating main landing gear as recited in claim 1, wherein the first linkage includes a set of articulating links operatively connected to the wheel axle fitting, the shock absorber and the aircraft.

3. A side articulating main landing gear assembly as recited in claim 2, wherein the second linkage includes a set of tire planing links operatively connected to the wheel axle fitting and the articulating links.

4. A side articulating main landing gear assembly as recited in claim 3, wherein the set of articulating links includes a main articulating link, an upper transverse link and a lower transverse link, and wherein the main articulating link is pivotally connected to a lower piston of the shock absorber.

5. A side articulating main landing gear assembly as recited in claim 4, wherein the set of tire planing links is located inboard of the set of articulating links, and include a lower planing link, an upper planing link and a free floating medial planing link.

6. A side articulating main landing gear assembly as recited in claim 5, wherein the lower planing link extends parallel to the main articulating link, and the upper planing link extends parallel to the lower articulating link.

7. A side articulating main landing gear assembly as recited in claim 1, wherein the inboard and outboard brace links of the reforming brace reside in a locked condition when the landing gear assembly is in the extended condition and in the retracted position.

8. A side articulating main landing gear assembly for an aircraft, comprising:
   a) a wheel axle fitting oriented in a horizontal plane when the landing gear is in an extended condition deployed from a landing gear bay of the aircraft;
   b) a tire supported on the wheel axle fitting and oriented in a vertical plane when the landing gear is in the extended condition;
   c) a shock absorber adapted to stroke between an extended state and a compressed state upon landing the aircraft;
   d) a set of articulating links operatively connected to the wheel axle fitting, the shock absorber and the aircraft, and configured to maintain the tire in said vertical plane as the shock absorber strokes between the extended state and the compressed state;
   e) a set of tire planing links operatively connected to the wheel axle fitting and the articulating links, and configured to maintain the wheel axle fitting in said horizontal plane as the shock absorber strokes between the extended state and the compressed state; and
   f) a drive crank operatively connected to the shock absorber, the tire planing links, the articulating links and the aircraft, for moving the landing gear assembly between the extended condition deployed from the landing gear bay and an inverted retracted condition stowed in the landing gear bay.
   g) a reforming brace operatively connected to the aircraft, the drive crank, the articulating links and the shock absorber for locking the landing gear in the extended condition and in the retracted condition, wherein the reforming brace includes inboard and outboard brace links connected to one another at an overcentered pivot point.

9. A side articulating main landing gear assembly as recited in claim 8, wherein the inboard and outboard brace links of the reforming brace reside in a locked condition when the landing gear assembly is in the extended condition and in the retracted condition.

10. A side articulating main landing gear assembly as recited in claim 8, wherein the shock absorber includes an upper cylinder and a lower piston, and wherein the drive crank is pivotally connected to the upper cylinder.

11. A side articulating main landing gear assembly as recited in claim 10, wherein the reforming brace is pivotally connected to the upper cylinder of the shock absorber in such a manner so that the reforming brace is out of plane with the shock absorber.

12. A side articulating main landing gear assembly as recited in claim 10, wherein the set of articulating links includes a main articulating link, an upper transverse link and a lower transverse link, and wherein the main articulating link is pivotally connected to the wheel axle fitting and the lower piston of the shock absorber.

13. A side articulating main landing gear assembly as recited in claim 12, wherein the set of tire planing links is located inboard of the set of articulating links, and include a lower planing link, an upper planing link and a free floating medial planing link.

14. A side articulating main landing gear assembly as recited in claim 13, wherein the lower planing link extends parallel to the main articulating link, and the upper planing link extends parallel to the lower articulating link.

* * * * *